US005297622A

United States Patent [19]

Brännström et al.

[11] Patent Number: 5,297,622

[45] Date of Patent: Mar. 29, 1994

[54] METHOD FOR COOLING OF DUST SEPARATED FROM THE FLUE GASES FROM A PFBC PLANT

[75] Inventors: Roine Brännström; Antal Molnar, both of Finspong, Sweden

[73] Assignee: ABB Stal AB, Finspong, Sweden

[21] Appl. No.: 937,835

[22] PCT Filed: Apr. 29, 1991

[86] PCT No.: PCT/SE91/00305

§ 371 Date: Oct. 20, 1992

§ 102(e) Date: Oct. 20, 1992

[87] PCT Pub. No.: WO91/17391

PCT Pub. Date: Nov. 14, 1991

[30] Foreign Application Priority Data

Apr. 30, 1990 [SE] Sweden ............................ 9001563-7

[51] Int. Cl.[5] ............................ F02C 3/26; F28C 3/16

[52] U.S. Cl. .............................. 165/104.16; 122/4 D; 34/57 A; 432/84

[58] Field of Search .................. 165/104.16; 122/4 D, 122/20 A, 20 B; 432/84; 34/57 A; 60/39.464

[56] References Cited

U.S. PATENT DOCUMENTS

| | | | |
|---|---|---|---|
| 3,242,974 | 3/1966 | Gouloumes | 165/1 |
| 3,705,620 | 12/1972 | Kayatz | 34/65 |
| 4,227,488 | 10/1980 | Stewart | 122/4 D |
| 4,544,020 | 10/1985 | Chrysotome et al. | 165/104.16 |
| 4,584,949 | 4/1986 | Brannstrom | 122/4 D |
| 4,655,147 | 4/1987 | Brannstrom et al. | 122/4 D |
| 4,909,028 | 3/1990 | Cetrelli et al. | 122/4 D |

FOREIGN PATENT DOCUMENTS

| | | |
|---|---|---|
| 2414768 | 10/1975 | Fed. Rep. of Germany . |
| 3112120 | 10/1982 | Fed. Rep. of Germany . |
| 461679 | 3/1990 | Sweden . |

*Primary Examiner*—Albert W. Davis, Jr.
*Attorney, Agent, or Firm*—Pollock, Vande Sande & Priddy

[57] ABSTRACT

A method is provided for cooling of particulate material from a combustion plant, especially intended for cooling of fine-grained dust which has been separated from the flue gases from a PFBC power plant, and in which the material is transported pneumatically with the flue gas as transport means. A cooler is provided at the inlet of which there is a space for separation of the particulate material from the transport gas. The transport gas is removed via a gas cleaner. The particulate material is collected in a duct where it forms a particulate column. The duct includes cooling modules, suitably water-cooled, which cool the material on its way down through the duct. The duct comprises devices for the supply of a gas for stirring the material in the duct while the remaining flue gas is being separated from the particulate column.

1 Claim, 2 Drawing Sheets

METHOD FOR COOLING OF DUST SEPARATED FROM THE FLUE GASES FROM A PFBC PLANT

FIELD OF THE INVENTION

The present invention relates to a method for cooling of particulate material. The method is particularly intended for cooling of very fine-grained dust, for example dust which has been separated from flue gases from a combustion plant with combustion of a fuel, primarily coal, in a pressurized fluidized bed. The cooling takes place before the gases are supplied to a gas turbine. A plant of this kind is generally called a PFBC power plant. PFBC are the initial letters of the English expression Pressurized Fluidized Bed Combustion.

BACKGROUND OF THE INVENTION

During combustion of coal in a fluidized bed of a particulate sulphur-absorbing material, for example lime or dolomite, a large quantity of ashes from the fuel and fine-grained absorbent residues accompany the flue gases. This dust is separated from the flue gases in a cleaning plant, usually consisting of cyclones, before the gases are utilized for operation of a gas turbine. In the following, the separated dust will be referred to as cyclone ash. The combustion is performed at a pressure considerably exceeding the atmospheric pressure. The pressure may be about 20 bar, is usually between 12 and 16 bar at full power, but is lower at partial power. The combustion of the fuel is performed in the bed at a temperature of about of 850° C. Combustion gases and accompanying dust have the same temperature as the bed. Also the separated dust, the cyclone ash, has this high temperature. Therefore, the handling of ashes entails considerable problems.

To be able to handle ashes, the following must be done:

1. The cyclone ash must be cooled to <100° C., preferably to <70° C. Cooling to this low temperature is necessary to permit the storage of the ash in ash silos of an inexpensive type, such as concrete silos, and to permit transportation of the ash by conventional bulk transport devices.

2. The pressure must be reduced from 3–16 bar to atmospheric pressure.

3. The temperature must be reduced to permit transportation of separated dust by simple transport devices to ash silos which must often be located at a considerable distance from the gas cleaning plant. Distances of 100–300 m are common.

4. Flue gases must be separated from the cyclone ash before the ash is cooled to a temperature which is below the dew point of sulphuric acid. The dew point is dependent on the pressure level, the moisture content, and the content of sulphur dioxide in the flue gases, which are used for pneumatic transport of the cyclone ash, and is generally between 100 and 180° C. Otherwise, sulphuric acid condenses on cooling surfaces at temperatures below the dew point and ash particles form a growing coating on the cooling surfaces until the external temperature of the coating becomes equal to or exceeds the dew point in question.

In known PFBC power plants, the cyclone ash is cooled from approximately 700° C. in two stages. In the first stage, the compressed combustion air is usully used as coolant, and in this first cooling stage the cooler may be a pressure-reducing ash discharge device which is located together with the combustor in a pressure vessel. The air temperature is, after the compression, 250–300° C. and makes possible cooling to 300–400° C. An ash discharge device of the above-mentioned kind designed as a cooler is described in European Patent No. 0 108 505.

In a second cooling stage, the cyclone ash may be cooled with water and the heat contents be utilized for preheating of, for example, feed water or distance heating water. The fine-grained state and poor thermal conductivity of the cyclone ash render the cooling difficult. To obtain good contact between ash and cooling surfaces, the cyclone ash is suitably fluidized in the cooler. Discharge of heat with the fluidization air entails an undesirable heat loss.

Swedish patent application 8802526-7 shows a cooler designed as a water-cooled transport screw. U.S. Pat. No. 4,492,184 shows a cooler designed as an inclined bed vessel where cyclone ash forms the bed.

SUMMARY OF THE INVENTION

According to the invention, a cooler for particulate material, especially a fine-grained material which has been separated from flue gases from a combustion plant and transported pneumatically to the cooler with flue gases as transport gas, comprises a space for separation of flue gases and dust, an outlet for the flue gases, a downwadly directed, suitably vertical duct with cooling devices, devices for the supply of gas, suitably air for the removal of flue gases from material flowing downwards in the duct, and a material discharge device at the lower part of the duct.

In a PFBC power plant the cooler in the first cooling stage is suitably located in the pressure vessel of the plant and the cooler in the second cooling stage outside thereof. The space for separation of transport gas and dust is located at the upper part of the cooler and above the duct. Transport gas and dust are suitably supplied to the cooler via a pressure-reducing nozzle and a reception chamber which is connected to the separation space.

The cooling device in the duct may comprise a number of cooling modules at different levels. The cooling modules are suitably connected in series. They may consist of tubular coils or vertically positioned plates. The discharge device may, for example, consist of a rotary vane feeder, a transport screw or a so-called L-valve at the bottom of the duct, which valve is connected to a conveying pipe opening out into a collecting silo.

To remove the last residues of flue gas in the column of dust in the duct, devices are provided for supplying the duct with gas, suitably air at one or more levels. This gas flows in a direction opposite to the dust flow. Gas may be supplied continuously but intermittent supply is more appropriate. By intermittent supply, a stirring of the dust in the dust column, which is favorable for the cooling effect, may be obtained with a minimum gas quantity and slight heat loss.

A transducer or usually several transducers are provided at the upper part of the cooler for determining the dust level. These transducers are connected to signal processing and control equipment for control of the discharge of material so that the material level is maintained within given limits.

DESCRIPTION OF THE PREFERRED EMBODIMENTS

Figure 1:
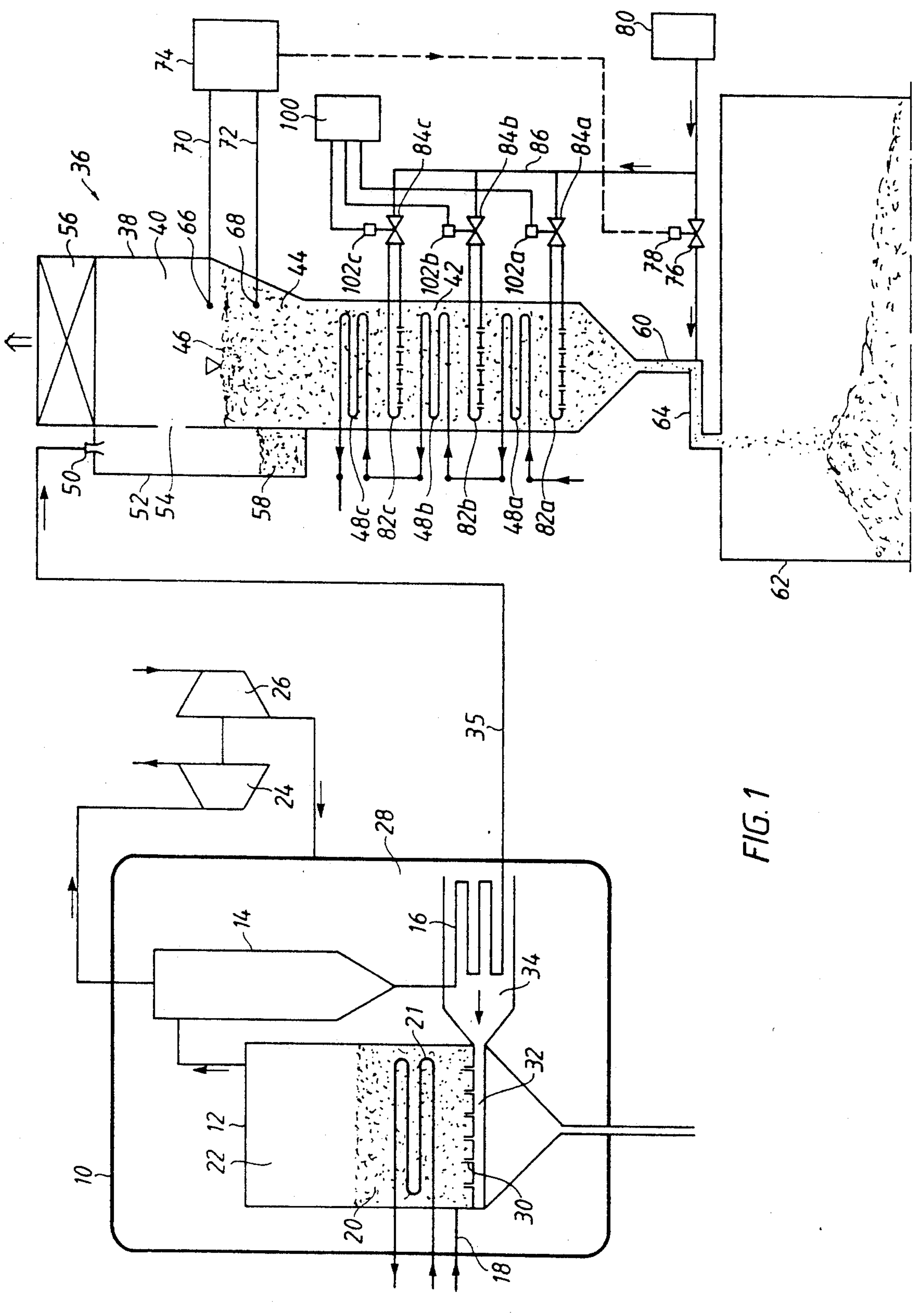
FIG. 1 schematically shows the invention applied to a PFBC power plant.
Figure 2:
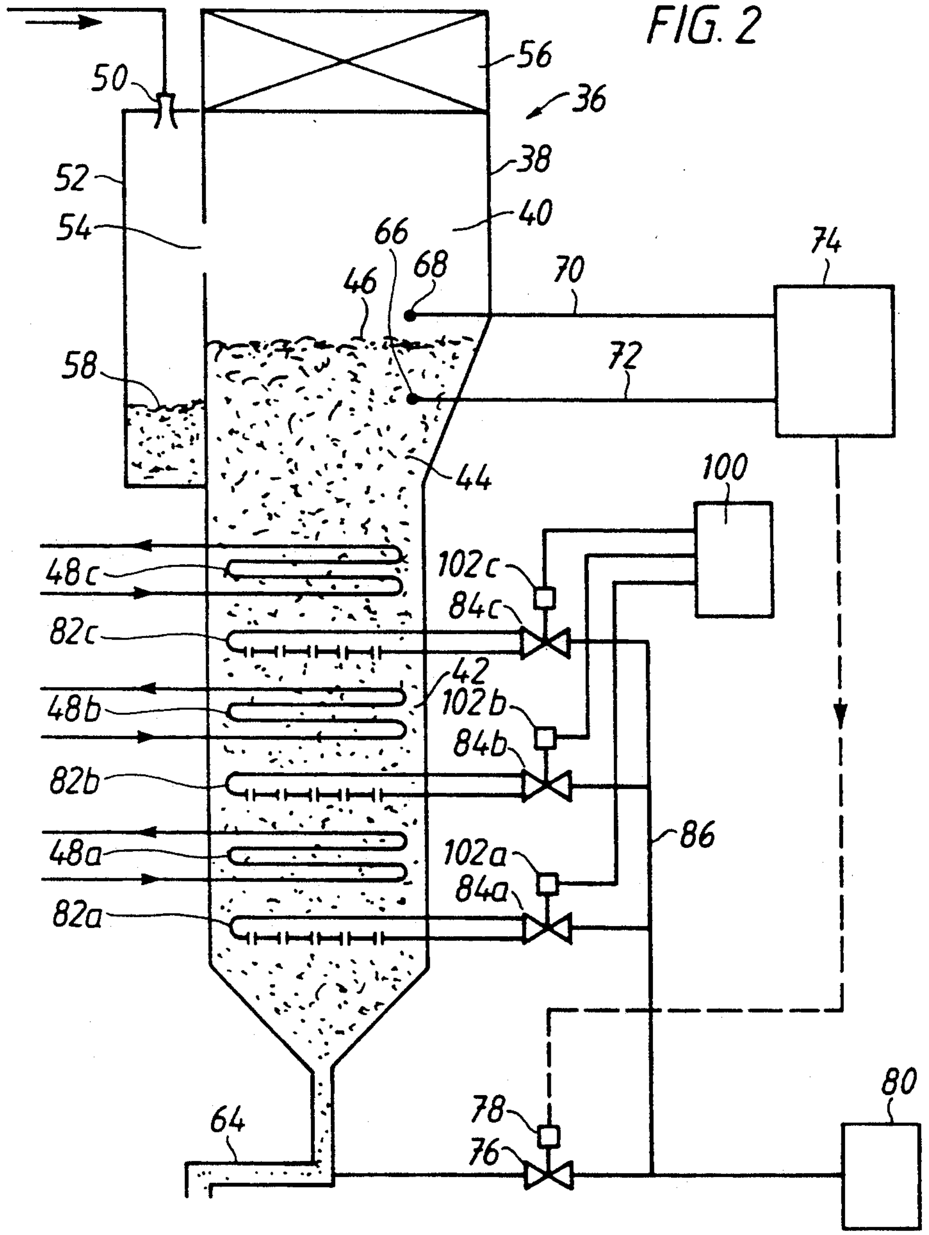
FIG. 2 shows the cooler with the coolers separately supplied with cooling water from separate coolant sources.

In the figures, 10 designates a pressure vessel. A combustor 12, a cleaning plant 14 and a pressure-reducing discharge device 16 are placed in the pressure vessel 10. Fuel is supplied to the combustor 12 via the conduit 18 and is burnt in the bed 20. Steam generated in tubes 21 drives a steam turbine (not shown). Combustion gases are collected in the freeboard 22, are cleaned in the cleaning plant 14, symbolized by a cyclone, and are supplied to the turbine 24. The turbine 24 drives the compressor 26 which feeds the space 28 in the pressure vessel 10 with compressed combustion air. On its way to nozzles 30 at the bottom 32 of the combustor 12, the combustion air passes through the pressure-reducing ash discharge device 16 which is designed as a cooler. This device 16 is placed in a channel 34 for the combustion air.

From the cyclone 14, separated dust is transported pneumatically with combustion gases as transport gas through the ash discharge device 16 formed as a cooler, where the dust and the gas are cooled from about 850° C. to 300°-400° C., and the conduit 35 to the subsequently located cooler 36, where the dust is cooled to <100° C. This second cooler 36 is formed as a vertical container with a space 40 in the upper part for separation of dust from the transport gas and with a vertical duct 42 in its lower part, where separated dust forms a material column 44 with an upper surface 46. In the embodiment shown, the duct 42 includes three cooling modules 48*a*, 48*b*, 48*c*, connected in series. Cooling water is supplied to the lowemost module and is discharged from the uppermost one. Thus, in the duct 42 material and cooling water will flow in opposite directions. Alternatively, it is possible to supply the cooling modules 48*a*, 48*b*, 48*c* with cooling water from different sources with different water temperatures. The lowermost cooling module 48*a* is supplied with the coldest water. In the embodiment shown, dust and transport gas are supplied to the cooler 36 via a pressure-reducing nozzle 50 and a reception chamber 52 which, via the opening 54, communicates with the space 40, where dust and transport gas are separated. The space 40 communicates with a filter 56 placed above the cooler 36. The reception chamber 52 has such a depth that an erosion-preventing material pad 58 is formed in the lower part thereof. At the bottom of the duct 42 there is a discharge device in the form of an L-valve 60. The cooler 36 is advantageously placed on top of a concrete silo 62 for collection of dust which is fed out via the L-valve 60 and is transported to the silo 62 via the conduit 64.

Figure 3:
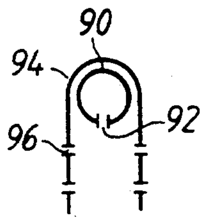
FIG. 3 shows an air nozzle.

In the upper part of the cooler, level sensors 66, 68 are provided for indication of the maximum and minimum allowable material level 46. These sensors are connected to the signal processing and level control equipment 74. The operating device 78 of the valve 76 is influenced through the operating conduit. The valve 76 is connected to a pressure medium source 80. Upon opening of the valve 76, material is fed out from the duct 42 of the cooler 36. To remove residues of combustion gases in the dust and stir the material in the dust column 44 in the duct 42 for improving the contact with the cooling surfaces, a number of air nozzles 82*a*, 82*b*, 82*c* are provided in the duct 42, which also communicate with the pressure medium source 80 via valves 84*a*, 84*b*, 84*c* and the conduit 86. As shown in FIG. 3, the air nozzles may also consist of tubes 90 with downwardly directed openings 92 and protective plates 94 with side openings 96. In this embodiment, dust is prevented from penetrating into the tubes and clogging these. The nozzles 82*a*, 82*b*, 82*c* are suitably supplied with air intermittently at appropriate time intervals. The air supply is controlled with the aid of control devices 100 which influence the operating devices 102*a*, 102*b*, 102*c* of the valves 84*a*, 84*b*, 84*c*.

We claim:

1. A method for cooling dust which accompanies flue gas from a PFBC plant, said method including the steps of:

separating the dust in a dust separator inside the pressure vessel of the PFBC plant from the flue gas;

subjecting the separated dust to a first cooling before it is transported out of the pressure vessel by means of the flue gas;

then subjecting the dust outside the pressure vessel to continued cooling while being stirred by;

a. supplying the flue gas transporting the dust outside the pressure vessel to the upper part of a vertical duct for absorption of the dust as a material column in the duct;

b. discharging the dust from the lower part of the material column while passing the dust down through the duct to maintain the surface of the material column within predetermined level limits;

c. cooling the dust in the material column by circulating coolant through cooling modules in the material column for successive reduction of the temperature of the dust in the material column, when the dust through the discharge at the bottom is being moved downwards through the duct;

stirring the dust in the material column by injecting a stirring gas into the material column while separating the remaining flue gas from the material column, before the dust has been cooled to a temperature which lies below the dew point for sulphuric acid, and causing the flue gas and the stirring gas to escape from the duct at the upper end thereof.

* * * * *